United States Patent
Shah et al.

(10) Patent No.: US 6,547,287 B1
(45) Date of Patent: Apr. 15, 2003

(54) DUCT CONNECTING SYSTEM HAVING INTEGRAL TRANSVERSE FLANGES

(75) Inventors: Ashok Shah, Naperville, IL (US); Richard Blum, Bollingbrook, IL (US)

(73) Assignee: Met-Coil Systems Corporation, Westfield, MA (US)

( * ) Notice: Subject to any disclaimer, the term of this patent is extended or adjusted under 35 U.S.C. 154(b) by 0 days.

(21) Appl. No.: 09/977,003

(22) Filed: Oct. 11, 2001

(51) Int. Cl.7 .................................................. F16L 23/00
(52) U.S. Cl. ........................ 285/405; 285/406; 285/364; 285/424
(58) Field of Search ................................. 285/405, 363, 285/364, 368, 412, 406, 424, 366

(56) References Cited

U.S. PATENT DOCUMENTS

| | | | |
|---|---|---|---|
| 4,466,641 A | | 8/1984 | Heilman et al. |
| 4,564,227 A | * | 1/1986 | Murck ........................ 285/364 |
| 4,579,375 A | | 4/1986 | Fischer et al. |
| 4,995,648 A | * | 2/1991 | Jackson ....................... 285/406 |
| 5,283,944 A | | 2/1994 | Goodhue |
| 5,321,880 A | | 6/1994 | Goodhue |
| 5,342,100 A | | 8/1994 | Goodhue |
| 5,358,013 A | * | 10/1994 | McClain .................. 285/405 X |
| 5,926,937 A | | 7/1999 | Goodhue |
| 6,109,665 A | * | 8/2000 | Meinig ........................ 285/405 |
| 6,412,519 B1 | * | 7/2002 | Goodhue .................. 285/363 X |

* cited by examiner

Primary Examiner—Lynne H. Browne
Assistant Examiner—David E. Bochna
(74) Attorney, Agent, or Firm—McCormick, Paulding & Huber LLP

(57) ABSTRACT

The invention relates to an improved system for connecting the ends of sheet metal ducts wherein each duct end is provided with an integral frame. Corner connectors defining perpendicularly extending arms are associated with each frame, and bolts or other fasteners are utilized for connecting the connectors and integral frames. The sections include an upturned portion extending perpendicularly outwardly from the duct wall, a second portion bent rearwardly from the outer end of the first portion, a third portion extending from the outer end of the second portion and forming an L-shaped double wall portion. When the frame is formed in this fashion, it is adapted to receive the side edges of respected arms of corner connectors whereby the ducts may be efficiently assembled by locating corner connectors in place and thereafter applying the fasteners used for maintaining the assembly.

19 Claims, 2 Drawing Sheets

DUCT CONNECTING SYSTEM HAVING INTEGRAL TRANSVERSE FLANGES

FIELD OF INVENTION

This invention relates to an improved system for connecting the ends of four sided rectangular sheet metal ducts wherein each duct end is provided with an integral transverse flange having a L-shaped double wall portion. The duct sections connected using the improved flange of the invention have increased strength over the prior art.

BACKGROUND OF THE INVENTION

This invention relates to an improved means for connecting the ends of a pair of sheet metal duct sessions. The invention particularly involves an assembly of the type including frame members defining integral transverse flanges located at a duct end with adjacent frame members joined to each other by angular corner connectors.

The prior art, particularly Heilman et al U.S. Pat. No. 4,466,641 and Fischer et al U.S. Pat. No. 4,579,375, the disclosures of which are incorporated herein by reference, disclose duct connecting systems using integral transverse flanges. These arrangements include a first portion extending perpendicularly outwardly from the duct wall and a second portion bent rearwardly from the outer end of the first portion thereby forming opposing channels. The side edges of an arm of a corner connector are adapted to be snapped and crimped into place in these channels for secure assembly. To hold the adjacent duct sections together, the adjacent sections are bolted to each other at their four corner connectors, thereby forming an assembled section of duct.

Apparatus to manufacture the Heilman et al. invention is manufactured and sold by The Lockformer Company of Lisle, Illinois and is referred to in the industry as the TDC ("Transverse Duct Connector") system. Apparatus to manufacture the Fischer et al duct is manufactured and sold by Engel Industries, Inc. of St. Louis, Mo. and is referred to in the industry as the TDF ("Transverse Duct Flange") system. While both systems have provided the industry with a useful duct system, primarily the TDC system, there remains a need in the industry for improvements to the systems as discussed herein.

FIG. 1 illustrates in cross section the roll-formed shape of the end 10 of one duct, and the roll-formed shape of the end 12 of an adjacent duct as disclosed in Heilman et al. The frame includes a first upturned portion 14 extending perpendicularly outwardly from the duct wall 16 and a second portion 18 bent rearwardly into position opposite an end portion of the duct wall. The width of an arm of a corner connector 20 substantially corresponds to the distance between the rearwardly bent portion 18 and the end portion of the duct wall. The side edges of each such arm of a corner connector 20 are adapted to engage the respective surfaces of the rearwardly bent second portion 18 and duct wall end portion whereby the corner connector 20 is held in position relative to the frame by a retainer means defined by the rearwardly bent second portion 18.

The preferred embodiment of the Heilman et al invention includes a third outwardly facing return portion 22 at the outward edge of the rearwardly bent second portion 18 thereby forming a bead 24. A first channel 26 is formed between the bead 24 and the outwardly extending upturned portion 14, and a second channel 28 is formed in the duct wall opposite the first channel 26. The side edges of an arm of a corner connector 20 are adapted to be snapped into place in these channels 26, 28 for secure assembly of the corner connectors relative to a frame. It has been found, however, that the corner connectors will b displaced during manufacture and transport of the duct. Therefore, the duct flanges must be crimped (not shown in FIG. 1) over the adjacent arms of a corner connector to secure the corner connector in place within a duct flange.

Pursuant to Heilman et al, when assembling one duct with another, the respective frames and associated corner connectors 20 are brought together, and bolt 30 or other suitable fastener is employed for achieving the desired connection. Prior to completion of this connection, a gasket 12 may be located between the respective frame portions for conventional purposes.

In order to strengthen the resultant duct joint formed by the Heilman et al invention, each of the arms of a corner connection 20 is provided with an offset ear which may be used for retaining a stiffener means, comprising a strip of spring steel or the like. Each stiffener means is held at its end beneath the offset ear and at its sides between channels 26 and 28. Furthermore, a clip 34 may also be engaged around the adjacent frame portions to provide a smooth exposed joint and to strengthen the joint.

The Fischer et al duct flange, illustrated at FIG. 2, uses a modification of the Heilman et al invention and discloses a duct connecting system having an outstanding web portion 36 extending at 90 degrees from the duct wall 38, with an outward-formed tracking ridge 40 spaced inwardly thereof and formed outwardly of the surface of the assembled duct wall 38. At the outer extremity of the web 36 is an outer flange 42 having a turned-under rounded edge 44, formed at an angle slightly in excess of 180 degrees and terminating in a spring margin 46 which extends back toward the web 36 and normally stands inwardly away from the outer flange 42. "Button lock" lances are said to be provided through the rounded-back edge 44 projecting aft. The spacing between the web 36 and the tracking ridge 40, which corresponds to the spacing from the web 36 of the somewhat bulbous rounded portion of the turned-under edge 44, is fixed to accommodate the side edges of an arm of a corner connector. The depth between the spring margin 46 and the outer surface of the duct wall 38 between the ridge 40 and the web 36, is such that the leg portions of a corner connector will snap into position and are said to be held by the spring margins 46 and the lanced projections, trapped by the tracking ridge 40. However, it has also been found that corner connectors will fall out of the Fischer et al. duct flange without crimping. Accordingly, the duct flange of the Fischer et al. duct, in practice, is crimped to hold a corner connector in place.

As with the Heilman et al invention, the Fischer et al. duct can be readily joined with an adjacent duct end by means of bolts or fasteners. Furthermore, gasket material may also be located between adjacent frames without difficulty to decrease leakage.

In order to increase duct flange strength about the duct joint formed by the Fischer et al invention, optional reinforcing bars may be utilized between the arms of adjacent corner pieces. Each bar may be snapped in position behind the outwardly-formed ridge 40 and the rounded edge 44 of the outer flange 42, and retained by the lanced projections. If desired, and elongated clip can also be positioned around the joint formed by adjacent duct flanges to support the middle portion of the integral flanges. Incorporation of the clip and reinforcing bar with adjacent duct flanges, helps to prevent bellowing and leakage caused by pressure exerted by materials flowing within the duct.

After issuance of the Heilman et al and Fischer et al patents, the corner connector was manually inserted into the duct flange and then manually crimped with a hammer or the like. This was, among other things, time consuming, hard on the worker and expensive to the sheet metal contractor. These problems were solved by the Cornermatic® machine sold by Iowa Precision Industries, Inc., Cedar Rapids, Iowa, and covered by U.S. Pat. Nos. 5,321,880 and 5,283,944 to Goodhue. These patents disclose an automated method and apparatus, respectively, for placement of corner connectors in transverse duct flanges. The Cornermatic® apparatus and method automatically insert a connector, such as described in Goodhue U.S. Pat. No. 5,342,100, in a duct flange and secure the connector within the flange by crimping the outer portion of the flange over the adjacent arms of the corner connector. The inventions of the Goodhue patents have been a commercial success in the industry.

BRIEF DESCRIPTION OF THE INVENTION

A primary object of the invention is to provide an integral transverse duct flange having an L-shaped double wall portion arranged adjacent to the flange and opposite a duct wall.

A further primary object of the invention is to provide a transverse duct flange which provides increased strength and rigidity across the joint created by adjacent integral transverse duct flanges.

A further primary object of the invention is to provide a transverse duct flange which will allow for the use of thinner gauge sheet metal in the construction of duct while providing the strength of a conventional duct flange using heavier gauge sheet metal.

Another object of the invention is to provide a transverse duct flange having additional strength which will alleviate the problems of bulging and leakage at adjacent duct flange joints.

A further object of the invention is to provide a transverse duct flange having additional strength which will alleviate the need to insert stiffeners or reinforcing bars, in certain applications, into the duct flange in order to strengthen the duct flange as is currently implemented with the prior art flanges.

A further object of the invention is to decrease the number of clips that are engaged about the respective connected adjacent flange portions to prevent leakage.

A further object of the invention is to provide a more cost efficient means of manufacturing and connecting sheet metal duct than the prior art.

The purposes of this invention are accomplished by providing for frame members defining integral transverse flanges located at a duct end with adjacent frame members joined to each other by angular corner connectors. The integral flange comprises an upturned portion extending perpendicularly outwardly from the duct wall, and a second portion bent rearwardly. The end of the second rearwardly bent portion is turned away from the duct wall and rounded back toward the upturned portion and bent under the upturned portion, forming a third bent portion. This third bent portion provides an L-shaped double wall portion having one arm of the L arranged adjacent to the surface of the upturned portion.

In the alternative, the third bent portion may be turned toward the duct wall and rounded back toward the upturned portion and bent on top of the upturned portion, thereby forming a L-shaped double wall portion having one arm adjacent to the surface of the rearwardly bent portion and the other arm of the L arranged adjacent to the surface of the upturned portion.

The L-shaped double wall portions disclosed above may also include a bead formed therein similar to the bead disclosed in the Heilman et al patent, thereby providing for a first channel formed between the bead and the upturned portion. A second channel may be formed in the duct wall opposite the first channel as generally disclosed in Heilman t al. the channel can be formed by creating a depression in the outside of the duct wall, as disclosed in Heilman et al, or by forming an outwardly facing ridge along the surface of the duct wall, as disclosed in Fischer et al. The side edges of an arm of a corner connector are adapted to be positioned into place in these channels, and thereafter the duct flange is crimped over the corner connector to secure it in place.

Assembling section of sheet metal duct having an integral flange arrangement of the type described by the present invention results in a stronger transverse duct joint. The stronger duct joint allows a contractor to use lighter gauge sheet metal, and ultimately less metal, than he would use if a duct flange is implemented. Moreover, the increased transverse duct joint strength recognized when using the present invention potentially alleviates the need for employing stiffeners or reinforcing bars when assembling sections of duct. As a consequence of using lighter gauge sheet metal and removing the need for stiffeners or reinforcing bars, the present invention provides a more cost efficient means of connecting sheet metal duct than previously known.

DETAILED DESCRIPTION OF THE PREFERRED EMBODIMENTS

Figure 1:
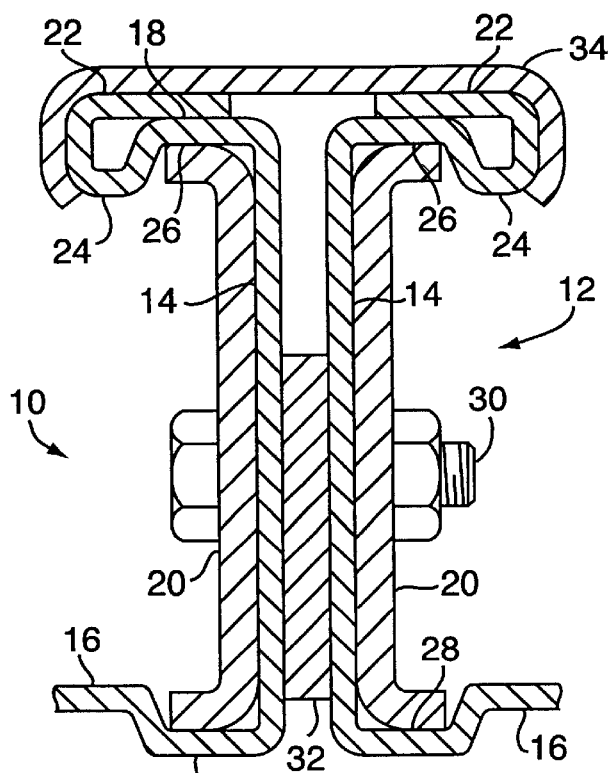
FIG. 1 is a fragmentary, cross-sectional view of a duct joint representative of the duct connecting system disclosed by Heilman et al.
Figure 2:
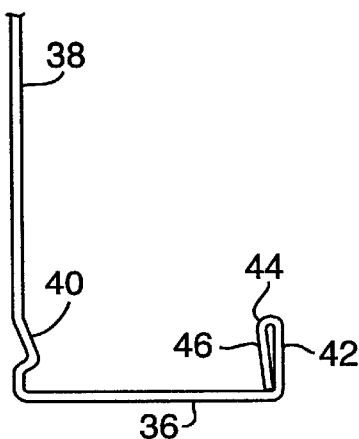
FIG. 2 is a sectional view of a duct wall and flange representative of the duct flange disclosed by Fischer et al.
Figure 3:
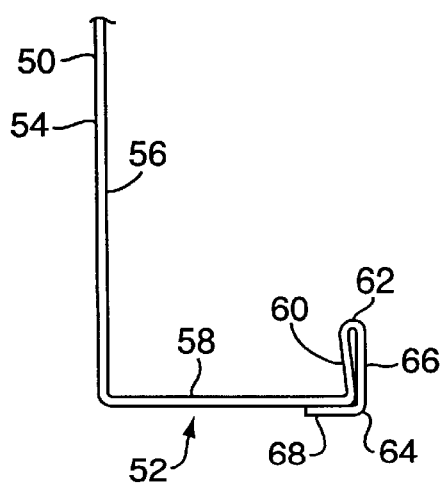
FIG. 3 is a sectional view of an integral duct flange representative of a preferred embodiment of the present invention.
Figure 6:
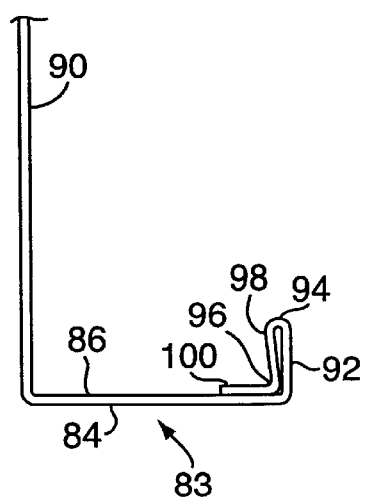
FIG. 6 is a sectional view of an integral duct flange representative of an alternative to the preferred embodiment of the present invention.
Figure 5:
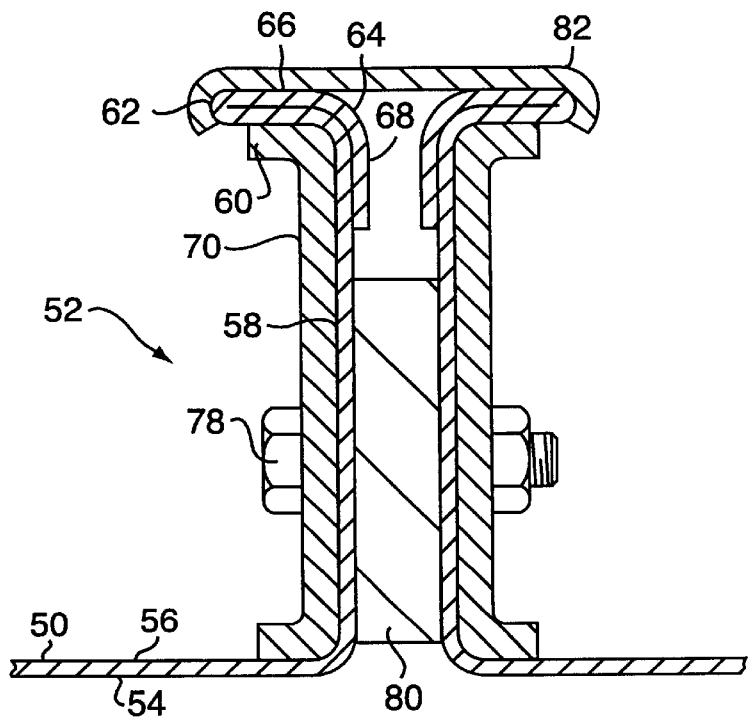
FIG. 5 is a fragmentary, cross-sectional view of a duct joint representative of the preferred embodiment of the present invention.
Figure 4:
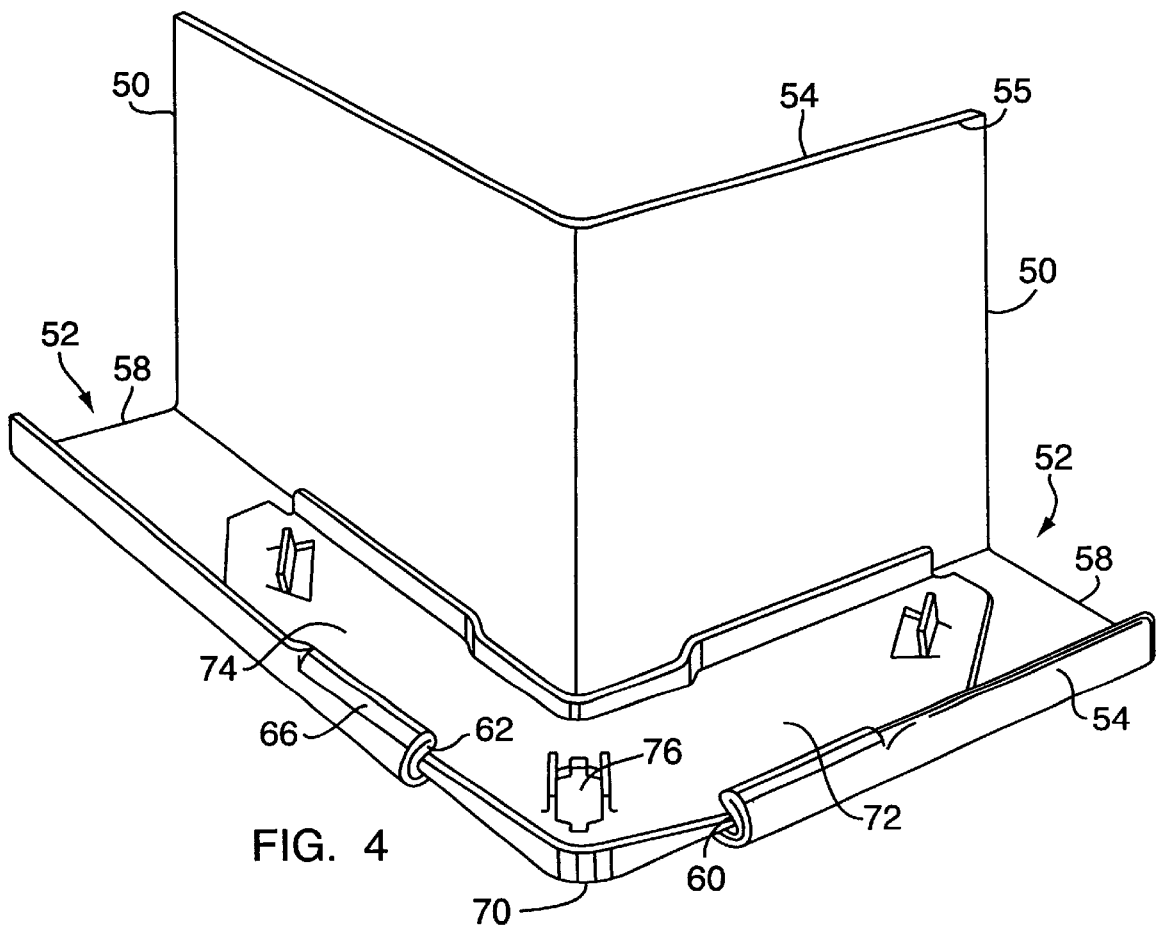
FIG. 4 is a perspective view of an integral duct flange representative of the preferred embodiment of the present invention.

The preferred embodiment of the integral transverse duct flange is shown in FIGS. 3, 4 and 5 where like numerals illustrate like portions of the invention. An alternative embodiment of the invention, which does not share like numbering with FIGS. 3,4 and 5 is illustrated in FIG. 6.

FIG. 3 illustrates a horizontal, sectional view of an integral transverse duct flange representative of the preferred embodiment of the present invention. FIG. 4 illustrates perspective view of a duct flange with an assembled corner connector as characterized by the features of this invention, and showing the duct flange crimped to hold the corner connector in place. FIG. 5 illustrates a fragmentary, cross-sectional view of a duct joint which includes integral transverse flanges characterized by the features of this invention (the crimping is not shown in this Figure).

The integral transverse duct flange generally comprises a duct having a duct wall 50 and a flange 52. Duct wall 50 has an inside surface 54 and an outside surface 56. The flange 52 has an inside surface that is continuous with inside of duct wall 50 and an outside surface that is continuous with the outside surface of duct wall 50. The flange 52 includes an upturned portion 58 extending perpendicularly from the duct wall 50.

More specifically, the flange 52 comprises the upturned portion 58 which extends perpendicularly from duct wall 50 and a second rearwardly bent portion 60 extending opposite a portion of duct wall 50. The end of rearwardly bent portion 60 is turned away from duct wall 50 and rounded back toward the upturned portion 58, forming a return portion 62. Return portion 62 delineates inside surface 54 of flange 52 from outside surface 56 of flange 52. Return portion 62 is extended to form a L-shaped double wall portion 64 having a first arm 66 arranged adjacent to and in close relation with the inside surface of rearwardly bent portion 60 and a second arm 68 arranged adjacent to and in close relation with the inside surface of upturned portion 58.

Second arm 68 extends toward duct wall 50 a distance substantially less than the length of upturned portion 58. As shown in FIG. 3, the second arm 68 of L-shaped portion 64 extends a distance less than half the length of upturned portion 58.

Referring now to FIG. 4, there is shown a perspective view of a duct flange with an assembled corner connector 70 having substantially perpendicular arms 72, 74, and a bolt hole 76. The corner connector 70 is as disclosed in U.S. Pat. No. 5,342,100 to Goodhue, and is incorporated herein by reference. The corner connector 70 is preferable inserted into duct 50 by the Cornermatic® machine, although other means are also acceptable. Arms 72, 74 are adapted to engage the respective surfaces of rearwardly bent portion 60 and duct wall 50 whereby corner connector 70 is held in position relative to the flange 52 by a retainer means defined by rearwardly bent portion 60. Corner connector 70 is positioned adjacent to and in close relation with the outside surface of upturned portion 58 and is secured within flange 52 by crimping rearwardly bent portion 60 and return portion 62 over arms 72, 74 or corner connector 70. the placement of corner connector 70 into flange 52 and subsequent crimping to secure corner connector 70 within flange 52 can be accomplished manually, but it is preferred that these steps be performed by the Corner Cadet™ machines covered by these patents and U.S. Pat. No. 5,926,937.

Referring now to FIG. 5, the integral transverse flange of the invention of FIGS. 3 and 4 is shown connecting two adjacent sections of duct to provide a duct joint. When assembling adjacent duct sections, the respective flange portions and associated corner connectors are brought together, and a bolt 78 or other suitable fastener is employed for achieving the desired connection. Prior to completion of this connection, a gasket 80 may be located between the respective flange portions for conventional purposes. A clip 82 may also be positioned engaging the respective connected adjacent flange portions. Clip 82 serves to decrease leakage about the duct joint. The crimping of the duct flange to maintain the corner connection in place is not shown in FIG. 5.

The above-described invention will be useful with 16 gauge to 26 gauge sheet metal duct. Generally, the L-shaped portion of the duct for 16 to 26 gauge sheet metal will be in the range of about 0.44 inches, and the second leg of the L being in the range of about 0.40 inches. It has been found that the L-shaped double wall portion defined in the present invention will provide additional strength to the resultant duct joints. By utilizing the invention and the automatic crimping mechanism of the Goodhue patents, U.S. Pat. Nos. 5,321,880 ; 5,283,944, and 5,926,937, it is not necessary to use the channel means of the Heilman et al and Fischer et al patents. Additionally, prior to Goodhue inventions, it is not believed that the manual crimping methods would have provided operable crimping to a double wall portion.

An example of the invention is provided based on 20 gauge sheet metal thickness of about 0.035 inches. In this preferred embodiment the upturned portion 58 has a length of about 1.210 inches, rearwardly bent portion 60 a length of about 0.370 inches, L-shaped portion 64 a total length of about 1.002 inches, the first arm 66 being 0.721 inches and the second arm 68 being about 0.281 inches. In this embodiment, it can be calculated that there will be additional strength to the duct joint on the order of about 20% over the conventional TDC based on moment of inertia calculations with a load being applied to the duct wall.

A modification of the embodiment of the invention not shown FIGS. 3, 4 and 5, provides additionally for an inwardly-formed channel formed in duct wall 50 opposite of rearwardly bent portion 60 and L-shaped double wall portion 64, similar to the channel disclosed in Heilman et al and incorporated herein by reference. The side edges of an of a corner connector 70 can be positioned against the channel and against rearwardly bent portion 66 for assembly of the corner connectors relative to a frame. Also, with additional reforming steps a second channel may be formed in the rearwardly bent portion 60 and L-shaped double wall portion 64 similar to that disclosed in Heilman et al, although such channel is not presently preferred due to the additional steps and costs in forming the flange.

A further modification of the embodiment of the invention not shown in FIGS. 3, 4 and 5, provides additionally for an outwardly-formed tracking ridge, similar to the ridge discussed in Fischer et al and incorporated hereby by reference, formed outwardly from the duct wall 50 and parallel to upturned portion 58. The tracking ridge protrudes outwardly from duct wall 50 a distance sufficient to form a channel between upturned portion 58 and the tracking ridge capable of accommodating the side edges of an arm of a corner connector 70.

An alternative embodiment to the inventions disclosed in FIGS. 3, 4 and 5, is shown in FIG. 6. This embodiment provide for a duct wall 90 having a transverse duct flange 83 having an inside surface 84 and an outside surface 86. The flange includes an upturned portion 88 which extends perpendicularly from the duct wall 90 and a second rearwardly bent portion 92 extending opposite a portion of duct wall 90. The end of rearwardly bent portion 92 is turned over toward duct wall 90 and rounded back forming a return portion 94. Return portion 94 delineates inside surface 84 of flange 83 from outside surface 86 of flange 83. Return portion 94 is extended to form a L-shaped portion 96 having a first arm 98 arranged adjacent to and in close relation with the outside surface of rearwardly bent portion 92 and a second arm 100 arranged adjacent to and in close relation with the outside surface of upturned portion 88.

Second arm 100 extends toward duct wall 90 a distance substantially less than the length of upturned portion 88. As shown in FIG. 6, the second arm 100 of L-shaped portion 96 extends a distance less than half the length of upturned portion 88; and preferably about 0.40 inches depending on the gauge of the sheet metal. The preferred dimensions for the flange discussed for the embodiment shown in FIG. 3 are also applicable for this embodiment.

An example of this embodiment is provided based on a 20 gauge sheet metal having a thickness of 0.035 inches. The upturned portion 88 has a length of about 1.313 inches, rearwardly bent portion 92 a length of about 0.932 inches, wherein the first arm 98 is about 0.651 inches and the second arm 100 is about 0.281 inches.

Further modifications of the embodiment of the invention shown in FIG. 6 can be made bases on the disclosures in the Heilman et al and Fischer et al patents as discussed above for FIGS. 3, 4 and 5.

It is understood that various changes and modifications may be made to the above described inventions without departing from the scope of the invention and as particularly as defined in the following claims:

It is claimed:

1. A sheet metal duct section comprising:
   a duct wall, said duct wall having an end; and
   an integral transverse flange formed at said end of said duct wall,
   wherein said integral transverse flange comprises a first upturned portion which extends perpendicularly outwardly from said end of said duct wall, a second portion bent rearwardly into a position opposite said end of said duct wall, and a third return portion providing a L-shaped double wall portion, one leg of said L-shaped double wall portion being substantially shorter than said "first upturned portion; wherein said L-shaped portion has a first arm arranged adjacent to and in close relation with said rearwardly bent portion and a second arm arranged adjacent to an in close relation with said upturned portion."

2. A sheet metal duct section in accordance with claim 1 wherein said third return portion comprises a portion turned away from said duct wall and rounded back toward said upturned portion.

3. A sheet metal duct section in accordance with claim 2 wherein said upturned portion is about 1.210 inches in length, said rearwardly bent portion is about 0.370 inches in length, and said L-shaped portion is about 1.002 inches in length, said first arm having a length of about 0.721 inches and said second arm having a length of about 0.281 inches.

4. A sheet metal duct section in accordance with claim 2 wherein the length of said rearwardly bent portion is about 31% the length of said upturned portion and the length of said L-shaped portion is about 83% the length of said upturned portion.

5. A sheet metal duct section in accordance with claim 1 wherein said third return portion comprises a portion turned toward said duct wall and rounded back toward said upturned portion, said return portion extended to form said L-shaped portion having a first arm arranged adjacent to and in close relation with said upturned portion, said second arm having a length less than said upturned portion.

6. A sheet metal duct section in accordance with claim 5 wherein said upturned portion is about 1.313 inches in length, said rearwardly bent portion is about 0.440 inches in length, and said L-shaped portion is about 0.932 inches in length, said first arm having a length of about 0.651 inches and said second arm having a length of about 0.281 inches.

7. A sheet metal duct section in accordance with claim 5 wherein the length of said rearwardly bent portion is about 34% the length of said upturned portion and the length of said L-shaped portion is about 71% the length of said upturned portion.

8. A sheet metal duct section in accordance with claim 1 wherein said duct wall has an outwardly-formed tracking ridge parallel and adjacent to said integral transverse flange.

9. A sheet metal duct section in accordance with claim 1 wherein said duct wall has an inwardly-formed channel parallel to said integral transverse flange.

10. A sheet metal duct section in accordance with claim 1 wherein said portion forms a bead.

11. A sheet metal duct having an integral transverse flange for connecting ends of sheet metal duct sections, the flange comprising:
    a section consisting of an integral part of a duct wall,
    a first upturned portion extending perpendicularly outwardly from said duct wall,
    a second portion bent rearwardly from the outer edge of said upturned portion into a position opposite an end of the duct wall,
    a third return portion turned away from said duct wall and rounded back toward said upturned portion from the outer edge of said second portion; and
    a fourth L-shaped portion extending from the outer edge of said return portion, said L-shaped portion having a first arm arranged adjacent to and in close relation with said rearwardly bent portion and a second arm arranged adjacent to and in close relation with said upturned portion, said second arm having a length substantially less than said upturned portion.

12. A sheet metal duct section in accordance with claim 11 wherein said upturned portion is about 1.210 inches in length, said rearwardly bent portion is about 0.370 inches in length and said L-shaped portion is about 1.002 inches in length, said first arm having a length of about 0.721 inches and a second arm having a length of about 0.281 inches.

13. A sheet metal duct section in accordance with claim 11 wherein the length of said rearwardly bent portion is about 31% the length of said upturned portion and the length of said L-shaped portion is about 83% the length of said upturned portion.

14. A sheet metal duct in accordance with claim 11 wherein said duct has a channel formed inwardly in said end portion of said duct will.

15. A sheet metal duct in accordance with claim 11 wherein said return portion forms a bead, said bead defining a channel formed between the bead and said upturned portion.

16. A sheet metal duct having an integral transverse flange for connecting ends of sheet metal duct sections, the flange comprising:
    a section consisting of an integral part of a duct wall, a first upturned portion extending perpendicularly outwardly from said duct wall,
    a second portion bent rearwardly from the outer edge of said upturned portion into a position opposite an end of the duct wall,
    a third return portion turned toward said duct wall and rounded back toward said upturned portion from the outer edge of said second portion; and
    a fourth L-shaped portion extending from the outer edge of said return portion, said L-shaped portion having a first arm arranged adjacent to and in close relation with said rearwardly bent portion and a second arm arranged adjacent to and in close relation with said upturned portion, said second arm having a length substantially less than said upturned portion.

17. A sheet metal duct section in accordance with claim 16 wherein said upturned portion is about 1.313 inches in length, said rearwardly bent portion is about 0.440 inches in length and said L-shaped portion is about 0.932 inches in length, said first arm having a length of about 0.651 inches and said second arm having a length of about 0.281 inches.

18. A sheet metal duct section is accordance with claim 16 wherein the length of said rearwardly bent portion is about 34% the length of said upturned portion and the length of said L-shaped portion is about 71% the length of said upturned portion.

19. A sheet metal duct in accordance with claim 16 wherein said duct has an outwardly-formed tracking ridge parallel and adjacent to said upturned portion, said ridge defining a channel formed between said ridge and said upturned portion.

* * * * *